No. 727,422. PATENTED MAY 5, 1903.
C. F. O'NEIL.
SPRINKLING CART.
APPLICATION FILED JULY 26, 1902.
NO MODEL.
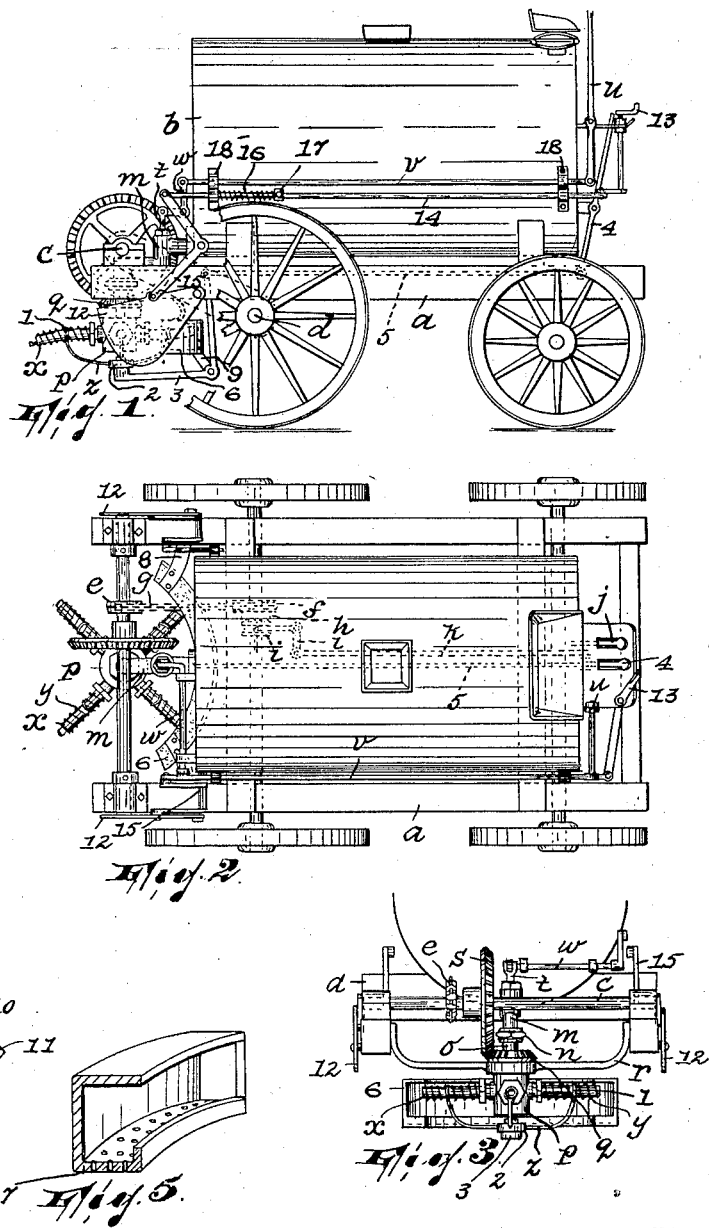

No. 727,422. Patented May 5, 1903.

UNITED STATES PATENT OFFICE.

CORNELIUS F. O'NEIL, OF PATERSON, NEW JERSEY.

SPRINKLING-CART.

SPECIFICATION forming part of Letters Patent No. 727,422, dated May 5, 1903.

Application filed July 26, 1902. Serial No. 117,063. (No model.)

*To all whom it may concern:*

Be it known that I, CORNELIUS F. O'NEIL, a citizen of the United States, residing in Paterson, county of Passaic, and State of New Jersey, have invented certain new and useful Improvements in Sprinkling-Carts; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to watering or sprinkling carts; and it has for its object to improve upon contrivances of this nature so that the sprinkling may be variously controlled in order not only to vary the sprinkling area, but to give direction to the sprinkling as desired.

The invention consists in the improved watering or sprinkling apparatus and in the several combinations and arrangements of parts constructed substantially as will be hereinafter described and finally embodied in the clauses of the claim.

My invention will be found fully illustrated in the accompanying drawings, in which corresponding characters of reference indicate like parts, and in which—

Figure 1 is a side view of my improved watering-cart. Fig. 2 is a top plan view. Fig. 3 is a rear view showing particularly the sprinkling apparatus proper, and Figs. 4 and 5 illustrate in perspective certain details of the invention.

In said drawings, $a$ is the vehicle, and $b$ the tank carried thereby. On the rear portion of the vehicle-frame is journaled a shaft $c$, extending parallel with the rear axle $d$ of the vehicle and adapted to be driven therefrom by sprockets $e f$ on said shaft and axle, the latter being loose on the axle, a chain $g$ passing around said sprockets and clutch members $h\ i$, the former of which is formed integral with said sprocket $f$ and the latter of which is keyed on the axle. The clutch member $i$ is controlled by a treadle $j$ through the medium of a connecting-rod $k$ and a bell-crank lever $l$.

$m$ is the discharge-pipe for the tank. Its outer end portion stands vertically and is connected by a suitable gland $n$ with the upwardly-projecting hollow stem or inlet-tube $o$ of a rotary distributing-chamber $p$. This chamber is formed at its upper end with a beveled pinion $q$, whereby it is revolubly sustained in a bracket $r$, suspended from the vehicle-frame. With this pinion engages a beveled gear $s$, secured on the shaft $c$. The water-supply through the pipe $m$ is controlled by a valve $t$, which is operated from a hand-lever $u$ through a connecting-rod $v$ and bell-crank lever $w$.

The distributing-chamber has a series of radially-extending nozzles $x$, which are made flexible by preference. The flexibility is such as gives the ends of the nozzles movement in a vertical direction and may be attained in a practical manner by forming the nozzles of elastic tubing, such as hose-pipe surrounded by elastic wire, as at $y$.

By raising and lowering the ends of the nozzles the sprinkling area, which, it should be remarked, is created by the rapid rotation of the distributing-chamber from shaft $c$, may be varied at will, and this is effected by means of a spider $z$, having looped ends 1, which receive the nozzle ends. This spider has its body portion formed as an annulus 2, arranged to rotate on the end of a bell-crank lever 3, which is controlled from a foot-treadle 4 through a connecting-rod 5. By means of the rotating nozzles I find that my machine will at once water or sprinkle the entire breadth of a roadway of the average width, and by adjusting the nozzles by the foot-lever or treadle the sprinkling area may be varied to accommodate the width of the roadway.

In order to prevent the nozzles throwing the water forward, but at the same time avoid diminishing the uniform distribution, I provide a fender 6, which is of curved or arc-shaped channeled form, having its lower wall 7 perforated. This fender is supported forward of the distributing device in the plane of the nozzles by brackets 8. It is in this fender that the bracket 9, in which the bell-crank lever 3 is fulcrumed, is mounted.

The spraying effect may be imparted to the water thrown by the nozzles by the device 10. This consists of a split tube having one end formed with an upturned extension 11, said tube being adapted to be inserted into the end of the nozzle in the manner illustrated in Fig. 4.

The throw of the water laterally may be confined by a stop (one on each side of the distributing device) in the form of a blade 12, which is suitably pivoted in the frame and which may be controlled by a foot-lever 13 through the medium of a connecting-rod 14 and another bell-crank lever 15. The blade is normally pressed upwardly out of the plane of the nozzles by a spring 16, interposed between a collar 17 on the connecting-rod 14 and one of the brackets 18, in which said connecting-rod is mounted. As shown in Fig. 1, the spring is compressed so that the blade is in position to check the water throw.

It will be understood that my apparatus is designed to be used not only for sprinkling water, but for throwing or spraying other liquids, such as oil, &c.

Having thus fully described my invention, what I claim, and desire to secure by Letters Patent of the United States, is—

1. The combination, in a watering or sprinkling cart, with the water-supply, of a rotary distributing device operatively connected with said supply, flexible discharge devices comprising a rotary spider engaging said devices for said distributing device, and means for adjusting said discharge devices, substantially as described.

2. The combination, in a watering or sprinkling cart, with the water-supply, of a rotary distributing device operatively connected with said supply and having its axis of rotation vertically arranged, flexible discharge devices for said distributing device, a rotary spider engaging said flexible devices, and means for raising and lowering said spider, substantially as described.

3. The combination, with the vehicle, of a tank, a rotary distributing apparatus, tubular connection between the tank and said distributing apparatus, pivoted blades forming means for confining the throw of the water from said distributing apparatus, said blades being disposed both sides of said apparatus, and means for raising and lowering said blades, substantially as described.

4. The combination of a tank, a rotary distributing apparatus, tubular connection between the tank and said apparatus, and a channeled fender having its bottom wall perforated and disposed in the plane of throw from said distributing apparatus, substantially as described.

5. A spraying device for a tubular liquid-distributer consisting of a split tube having one end formed with an extension whose extremity is bent off into alinement with the bore of said tube, said split tube being adapted to be inserted into said distributer, substantially as described.

In testimony that I claim the foregoing I have hereunto set my hand this 23d day of July, 1902.

CORNELIUS F. O'NEIL.

Witnesses:
JOHN W. STEWARD,
JAMES B. NEWTON.